June 8, 1926.
J. D. HILL, SR
1,587,834
RAT TRAP
Filed Jan. 28, 1925
2 Sheets-Sheet 1
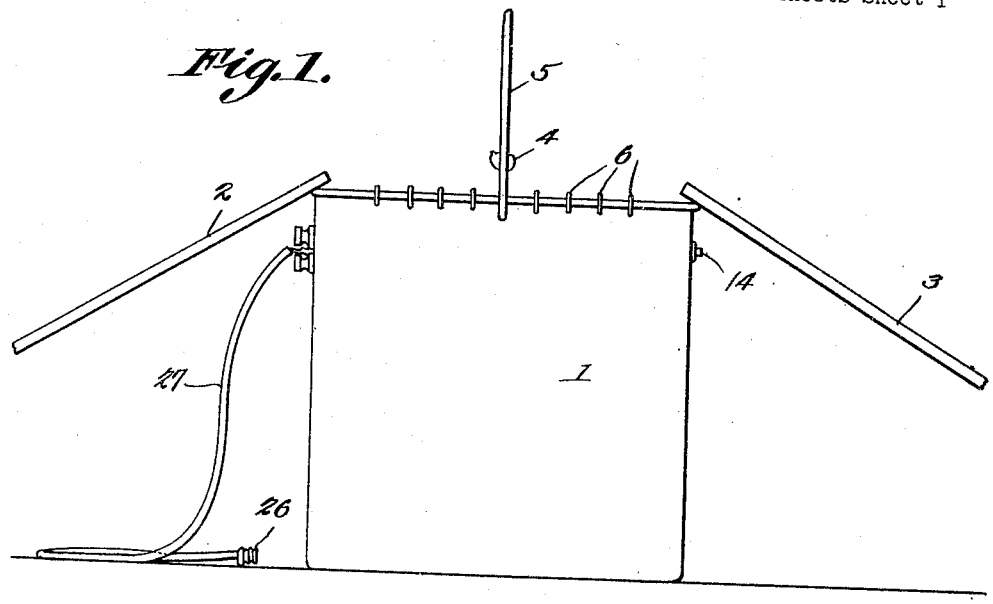
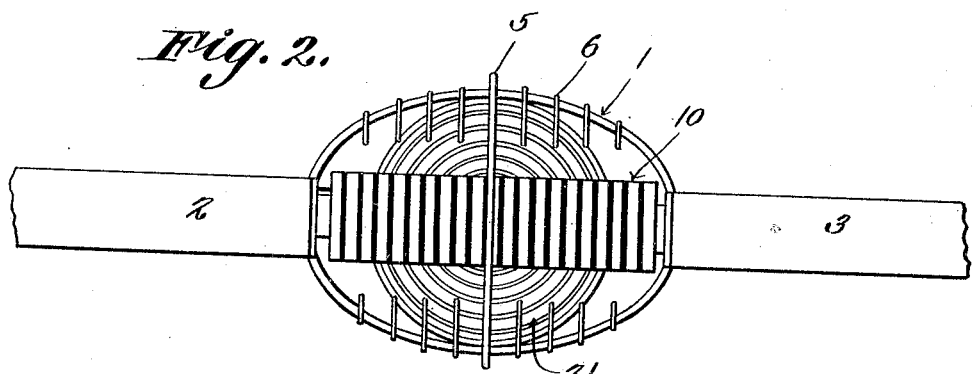
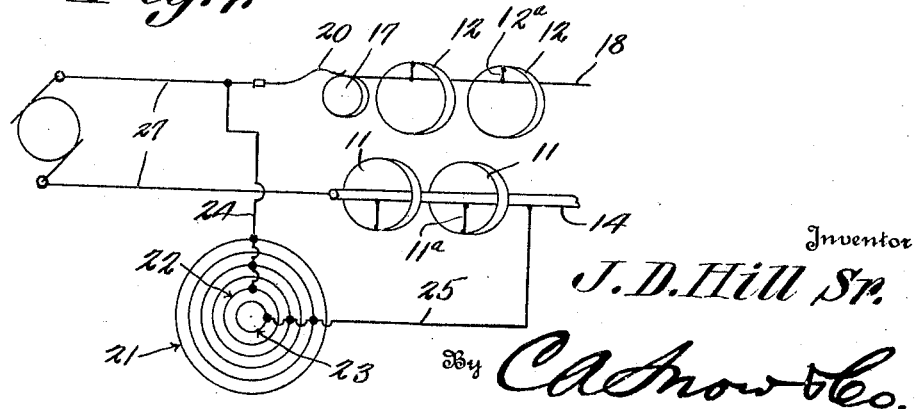
Inventor
J. D. Hill Sr.
By C. A. Snow & Co.
Attorneys June 8, 1926.
J. D. HILL, SR
1,587,834
RAT TRAP
Filed Jan. 28, 1925  2 Sheets-Sheet 2
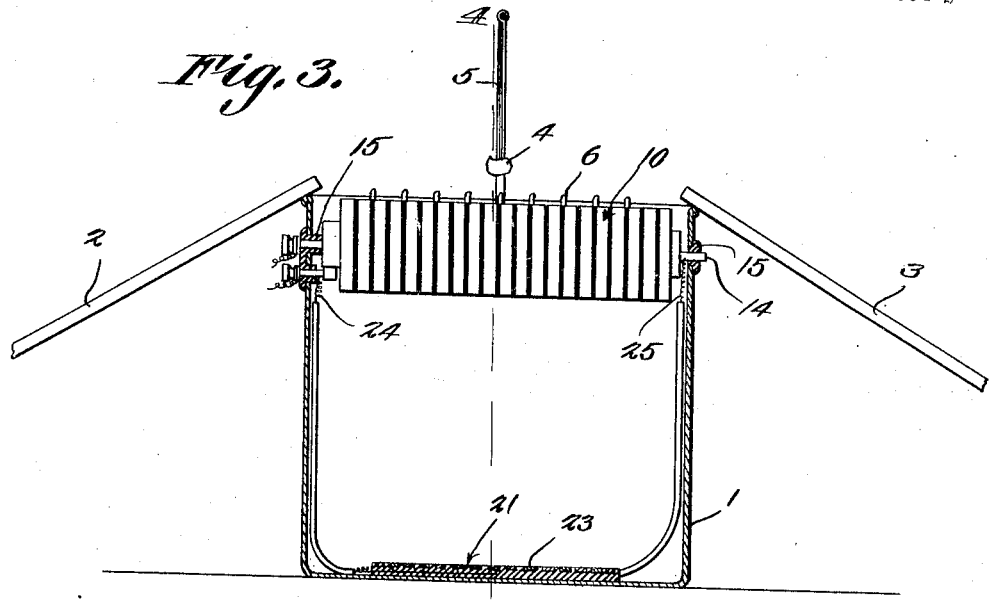
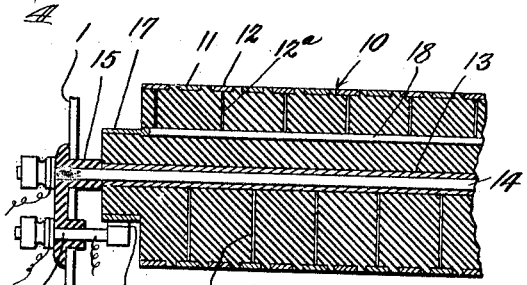
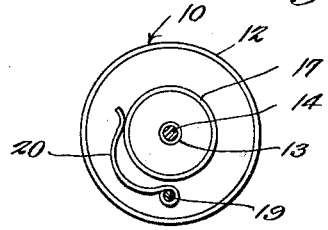
Inventor
J. D. Hill Sr.
By C A Snow & Co.
Attorneys Patented June 8, 1926.

1,587,834

UNITED STATES PATENT OFFICE.

JOHN D. HILL, SR., OF LITTLE ROCK, ARKANSAS.

RAT TRAP.

Application filed January 28, 1925. Serial No. 5,311.

This invention relates to rat traps and more particularly to electric devices of this character.

The object of the invention is to provide a rat trap so constructed that a rodent in attempting to secure the bait will receive an electric shock which will knock him off his balance and cause him to drop into a container provided for this purpose and from which he cannot escape.

Another object is to so construct a trap of this character that a rat or other rodent falling thereinto and not killed by the first shock will be electrocuted on reaching the bottom of the container.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a trap constructed in accordance with this invention;

Fig. 2 is a top plan view thereof;

Fig. 3 is a longitudinal section through the trap;

Fig. 4 is a transverse section taken on the line 4—4 of Fig. 3;

Fig. 5 is a detail sectional view through the roller constituting a part of the invention;

Fig. 6 is an end elevation of the roller; and

Fig. 7 is a diagrammatic view showing the electrical circuit employed in the apparatus.

In the embodiment illustrated a container 1 is shown which may be of any suitable material and of any desired size according to the use for which it is intended. This container 1 is open at its top and has leading up from opposite sides thereof run-ways 2 and 3 up which the rats may climb in their attempt to secure the bait 4 which is shown suspended by an upstanding bail 5 over the center of the container.

A roller 10 is rotatably mounted in the upper end of the container 1 in position directly below the bait 4 and which is electrically connected so that when a rat walking up the run-way steps on to the roller in its attempt to reach the bait 4 will close a circuit through his body and receive an electric shock which if it does not kill him will cause him to lose his balance and drop down into the container 1.

Arranged around the edge of the container 1 which is here shown oblong in cross section, are a plurality of wire fingers 6 which extend obliquely downward and inward into the container and operate to prevent the rat from climbing out in case he should not be killed.

The roller 10 is constructed as shown in Fig. 5 it being formed of insulating material and having metal bands 11 and 12 arranged around the periphery thereof, said alternating bands being electrically connected with the positive and negative poles of the electric circuit. As shown a metal sleeve extends longitudinally through the center of the roller as shown at 13 and forms a bushing for a metal spindle 14, the opposite ends of which are mounted to rotate in insulated bearings 15 mounted in the end walls of the container 1. One end of the roller 10 is reduced as shown at 16 and has a metal band 17 arranged around the periphery thereof and with which is connected a metal rod 18 which extends longitudinally through the roller and is connected by wires with the bands 12 while bands 11 are connected by wires 11ª with the metal sleeve 13 as is shown clearly in Fig. 5. A binding post 19 extends through one end wall of the container 1 being insulated therefrom as is shown clearly in Fig. 5 and has a wiping finger 20 held yieldably in engagement with the band 17. This finger 20 as shown in Fig. 6 is made in the form of an outwardly bowed spring and is designed to conduct the current from the binding post 19 to the band 17 from which it passes to rod 18 and through wires 12ª to the bands 12. The rod 14 which forms a journal for the roller is equipped at its end with an electrical connection for uniting it to the other pole of the electric circuit.

It will thus be seen that the alternating bands 11 and 12 form contacts which when closed by the body of the animal stepping onto the adjacent bands will cause the electric current to flow through said animal's body and if it does not kill him will shock him so that he will lose his balance and drop off the roller into the container.

Located in the bottom of the container is an electric pad 21 having plates 22 and 23 insulated from each other and connected respectively by wires 24 and 25 with the conductors which lead to the positive and negative poles of the electric source so that the animal dropping into the container onto said pad will be further shocked or electrified and either rendered helpless or killed. The wires 24 and 25 are shown insulated throughout the greater portion of their length to hold them out of contact with the metal walls of the container.

An electric plug 26 for connecting the apparatus with a suitable source of current is carried by a cable 27 in which are located the conductor wires which are connected with the binding posts 19 and 14.

From the above description it will be obvious that this trap may be carried from place to place and connected with any suitable source of electricity by means of the plug 26 and when set with the run-ways 2 and 3 positioned so that the animals to be trapped may pass onto the roller 10 these animals will be quickly electrocuted and deposited in the container from whence they may be removed when desired.

I claim:—

In an electric rat trap, a container open at its upper ends, wire fingers arranged in spaced relation with each other and having their free ends extending inwardly towards the center of the container, a roller mounted in the open end of the container and arranged between the free ends of the fingers, said roller having spaced contact bands positioned thereon, means for supplying electric energy to the contact bands to cause an electric circuit to be passed through the rat contacting with the bands, and said fingers adapted to cooperate with the roller to prevent rats from escaping from the container.

In testimony that I claim the foregoing as my own, I have hereto affixed my signature.

JOHN D. HILL, Sr.